United States Patent [19]

Itoh et al.

[11] 4,400,606
[45] Aug. 23, 1983

[54] METHOD AND APPARATUS FOR DISCHARGE MACHINING POLYGONAL CONTOURS

[75] Inventors: Testuro Itoh; Toshiro Oizumi; Shigeo Yamada, all of Nagoya, Japan

[73] Assignee: Mitsubishi Denki Kabushiki Kaisha, Tokyo, Japan

[21] Appl. No.: 194,745

[22] Filed: Oct. 7, 1980

[30] Foreign Application Priority Data

Oct. 11, 1979 [JP] Japan ................................ 54/131026
Jan. 30, 1980 [JP] Japan ................................ 55/9723
Jan. 30, 1980 [JP] Japan ................................ 55/9724
Jan. 30, 1980 [JP] Japan ................................ 55/9725

[51] Int. Cl.$^3$ .............................................. B23P 1/12
[52] U.S. Cl. ............................ 219/69 M; 219/69 V; 219/69 C
[58] Field of Search ................. 219/69 V, 69 M, 69 C

[56] References Cited

U.S. PATENT DOCUMENTS

3,564,190 2/1971 Kandajan et al. ................ 219/69 M
4,152,570 5/1979 Inoue et al. ....................... 219/69 V
4,310,742 1/1982 Pfau .................................. 219/69 M

Primary Examiner—C. C. Shaw
Attorney, Agent, or Firm—Sughrue, Mion, Zinn, Macpeak & Seas

[57] ABSTRACT

A discharge machining method for machining a workpiece by causing electric discharge between the workpiece and the machining electrode and an apparatus for practicing the method wherein, with the electrode confronting the workpiece in a primary machining direction and in the direction of a plane substantially perpendicular to the primary machining direction, the relative displacement of the electrode and workpiece is controlled in such a manner that a space is maintained between the electrode and the workpiece so that electric discharge occurs therein. The electrode is moved towards the intersections of straight lines which are parallel to and equally spaced from the contour of the electrode whereby the electrode is uniformly consumed. Very little abnormal arcing can occur. The machined workpiece has an excellent final configuration.

16 Claims, 13 Drawing Figures

$$\begin{cases} |\vec{a}| = \dfrac{R}{\sin\dfrac{\theta_1}{2}}, & <\vec{a} = \theta_2 - \dfrac{\theta_1}{2} \\ |\vec{b}| = \dfrac{R}{\sin\dfrac{\theta_2}{2}}, & <\vec{b} = \pi - \dfrac{\theta_2}{2} \\ |\vec{c}| = \dfrac{R}{\sin\dfrac{\theta_3}{2}}, & <\vec{c} = -\dfrac{\theta_3}{2} \end{cases}$$

METHOD AND APPARATUS FOR DISCHARGE MACHINING POLYGONAL CONTOURS

BACKGROUND OF THE INVENTION

The present invention relates to discharge machining methods in which a workpiece is machined by applying electric current to the workpiece and the machining electrode through a machining solution in the interelectrode space between the workpiece and the electrode and to apparatuses for practicing these methods. More particularly, the invention relates to improvements in such discharge machining methods and apparatuses.

In a conventional discharge machining method, a workpiece is machined by electric discharge which is carried out between the workpiece and the machining electrode while the electrode is moved relative to the workpiece in a primary or main machining direction, hereinafter referred to as "a Z-axis direction or a Z-axis", when applicable. Then, the electrode is moved in a plane substantially perpendicular to the Z-axis, hereinafter referred to as "an X-Y plane", when applicable. The former and latter relative movements of the workpiece and the electrode are referred respectively to as "a primary machining feed" and "a secondary machining feed" hereinafter when applicable.

A discharge machining method utilizing a primary machining feed along the Z-axis and a secondary machining feed in the X-Y plane is well known as disclosed in Japanese Published Patent Application No. 3594/1966, for instance. This conventional method is advantageous in that a plurality of machining steps, namely, a coarse machining step, a middle machining step, a middle finish machining step, a finish machining step and a fine finish machining step can be carried out continuously. In general, in the coarse machining step, only the primary machining feed along the Z-axis is carried out using a large electric current as a result of which the machining gap is relatively large. As the discharge machining operation advances towards the fine finish machining step, the discharge current is gradually decreased while the machining gap is also decreased. The above-mentioned secondary machining feed in the X-Y plane makes it possible to smooth the machined surfaces with a single electrode while making up for the decrease of the machining gap.

With a conventional discharge machining apparatus utilizing a secondary machining feed, powder or chips which are created by the discharge machining and are retained in the machining gap and portions of the insulating machining solution which have been thermally decomposed by high temperature arcs during the discharge machining can be removed by the pumping action of the machining solution which is carried out in association with the secondary machining feed with the result that satisfactory surface roughness is provided for the workpiece.

An example of the conventional discharge machining method will be described with reference to FIG. 1.

Figure 1:
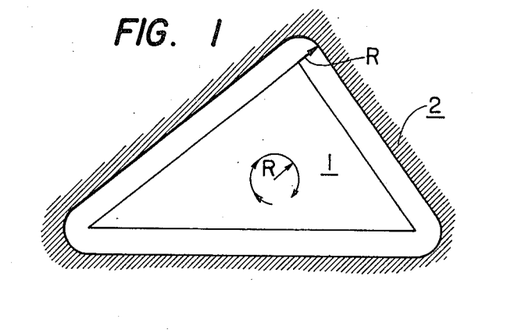
FIGS. 1 and 2 are explanatory diagrams showing conventional discharge machining methods in which an electrode is displaced relative to a workpiece.

FIG. 1 illustrates how an ordinary machining operation is carried out according to the conventional discharge machining method in which a workpiece 2 is machined with an electrode 1 which is scalene-triangular in section. A secondary machining feed, which is a circular motion in this case, in the X-Y plane is imparted to the electrode 1, the radius of the circular motion being indicated by R. This method provides the same effect as an electrode the radius of which is as large as the radius R which can be selected as required. However, as is apparent from FIG. 1, ech corner of the configuration which is formed on the workpiece is rounded with a radius R. That is, the configuration formed in the workpiece is considerably different from the configuration of the electrode. Thus, the method is disadvantageous in that a workpiece cannot be machined with a high accuracy.

Figure 2:
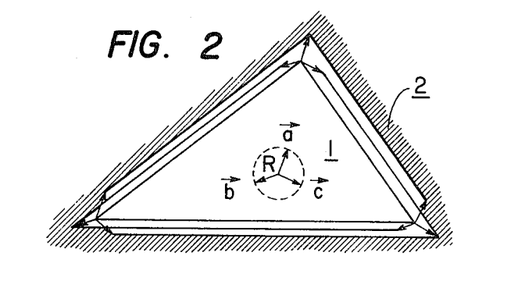

In order to eliminate the above-described difficulty, a variety of secondary machining feed methods have been proposed in the art. One of the methods is as illustrated in FIG. 2 in which an electrode 1 is moved relative to a workpiece 2 radially and in equal length movements towards the vertices of the configuration which is to be formed in the workpiece 2. In FIG. 2, the relative displacements towards the vertices are indicated by vectors $\vec{a}$, $\vec{b}$ and $\vec{c}$, respectively, the magnitudes of which are all equal to R. As is clear from the configuration formed in the workpiece shown in FIG. 2, the interior angles are irregular even if the electrode is radially moved relative to the workpiece as described above. That is, the formed configuration is considerably different from that of the electrode 1. Thus, the discharge machining according to this method is still unsatisfactory in accuracy.

Figure 3:
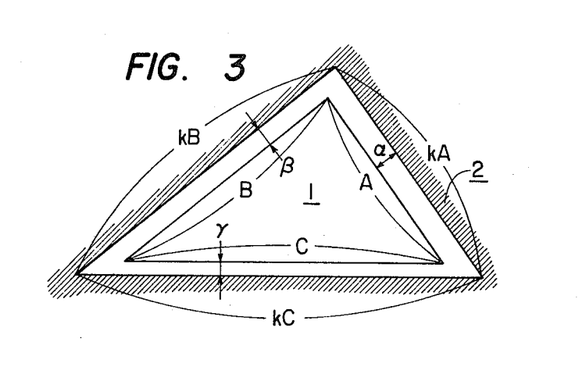
FIG. 3 is an explanatory diagram showing another conventional discharge machining method in which a workpiece is machined to have a configuration which is similar to the contour of the electrode.

Another improved method is illustrated in FIG. 3. In this method, a secondary machining feed is carried out in which the three sides A, B and C of the electrode 1 are displaced relative to the workpiece 2 in a ratio k of similarity. However, this method is also disadvantageous in that the machining gaps $\alpha$, $\beta$ and $\gamma$ between the electrode 1 and the workpiece 2 are different from one another and therefore the configuration formed is different from the configuration of the electrode unless the electrode happens to be an equilateral triangle in section. More specifically, in the conventional method illustrated in FIG. 3, the enlargement widths $\alpha$, $\beta$ and $\gamma$ which are obtained from the secondary machining feeds of the electrode are different from one another. Therefore, the method suffers from a drawback in that the machined surfaces are not uniform after a plurality of machining steps from a coarse machining step to a fine machining step. That is, discharge machining with this technique does not yield satisfactory surface roughness on a workpiece.

SUMMARY OF THE INVENTION

Accordingly, an object of the present invention is to provide a discharge machining method by which a workpiece is machined to have a configuration which is in conformance with the contour of a machining electrode and of which the corners are also satisfactorily in conformance with the contour of machining electrodes.

Another object of the invention is to provide an improved discharge machining method in which an electrode is uniform in consumption and in the chemical changes in its material and the probability of generation of abnormal arcs are low.

A further object of the invention is to provide a discharge machining method in which the electrode space between an electrode and a workpiece is maintained suitable and the workpiece is machined with high accuracy.

A still further object of the invention is to provide a discharge machining method which is high in machining efficiency.

A particular object of the invention is to provide a discharge machining apparatus which can readily achieve the foregoing objects of the invention.

These, as well as other objects of the invention, are met by a discharge machining method for machining a workpiece by applying electric current to the workpiece and an electrode through a machining solution in the electrode space between the workpiece and the electrode including the steps of displacing the electrode and workpiece relative to each other in a plane with the direction of confrontation of the electrode and workpiece being divided into a primary machining direction and the direction of the plane which is substantially perpendicular to the main scanning direction. Discharge machining is then performed while controlling the electrode and the workpiece in such a manner that an interelectrode space predetermined dimensions is maintained between the electrode and the workpiece to an extent that electric discharge occurs in the interelectrode space. Relative displacement is effected towards the intersections of straight adjacent lines which are parallel to and equally spaced from the contour of the electrode. In one embodiment, the electrode and workpiece are relatively displaced a plurality of times with the intersections of adjacent straight lines as final displacement points. The adjacent straight lines are parallel to and equally spaced from the contour of the electrode to define a desired machining margin. The relative displacement is carried out along displacement vectors extending to the final displacement points. The distance between each straight line and the contour of the electrode may be slightly increased while the relative displacement to each final displacement point is carried out. A predetermined minute displacement motion may be superposed on the relative displacement to an extent that the machining accuracy is not affected by the superposition.

Yet further, these as well as other objects of the invention are met by a discharge machining apparatus for machining a workpiece by applying electric current to the workpiece and an electrode through a machining solution in the interelectrode space between the workpiece and the electrode including first and second driving means. The first driving means first determines whether or not discharge machining is acceptable in a primary machining direction. If so, the first driving means moves the electrode relative to the workpiece with a predetermined machining space being maintained between the electrode and the workpiece. The second driving means moves the electrode relative to the workpiece in a direction substantially perpendicular to the primary machining direction. A numerical control device provides instruction signals to control the amount of relative movement of the electrode driven by the second driving means. Drive means drives the second driving means in response to instruction signals outputted by the numerical control device in signals representative of conditions of the machining space. Timer means may be provided for operating the numerical control device to provide instruction signals for displacement vectors each predetermined period of time. A detection means may be provided for detecting the interelectrode voltage between the electrode and the workpiece which outputs a pulse signal having a frequency which corresponds to the interelectrode voltage thus detected. Means may also be provided for outputting, when the number of pulses produced by the detection means reaches a predetermined value, a drive signal for a displacement vector provided by the numerical control device to drive the second driving device.

DESCRIPTION OF THE PREFERRED EMBODIMENTS

Figure 4:
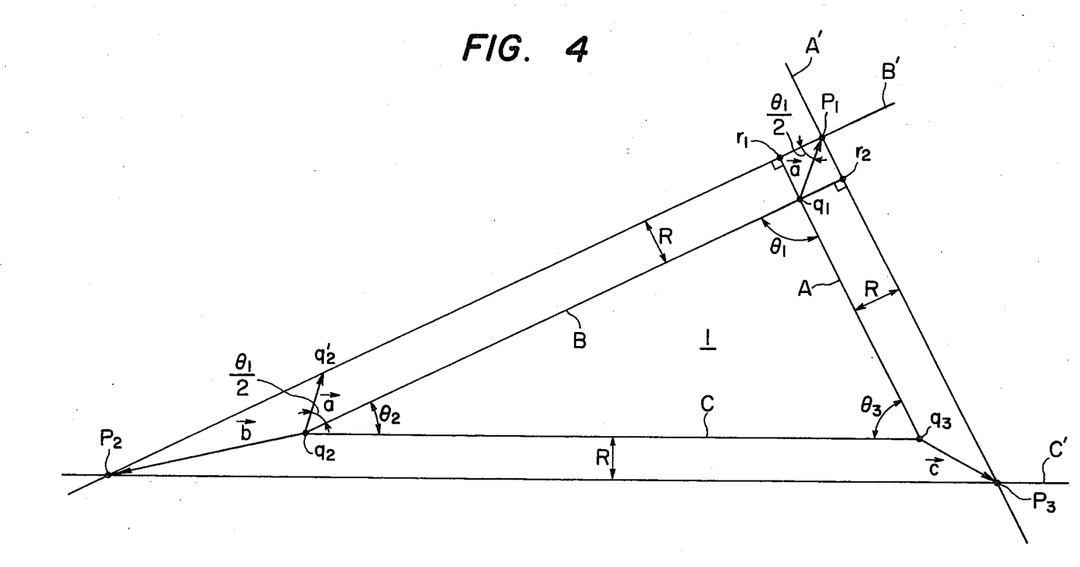
FIG. 4 is an explanatory diagram for a description of the ideal relative displacement of an electrode and a workpiece in a preferred example of a discharge machining method according to the invention.
Figure 5:
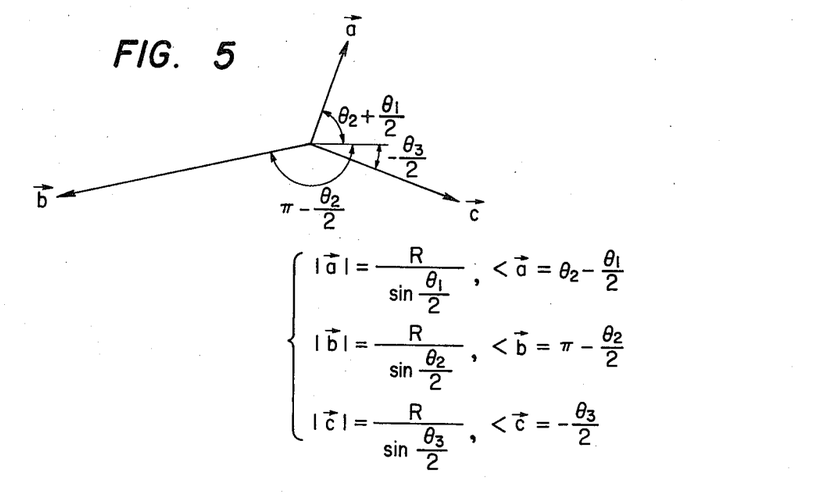
FIGS. 5 and 6 are diagrams showing vectors representative of the relative displacement in FIG. 4.

A first example of a discharge machining method according to the invention will be described with reference to FIG. 4. FIG. 4 shows the secondary machining feed of an electrode 1. In FIG. 4, a configuration which is formed in a workpiece by feeding the electrode 1 is defined by straight lines A', B' and C' which are parallel to and spaced by a distance R from the sides of the electrode 1, respectively. The intersections of these straight lines A', B' and C' are indicated by $P_1$, $P_2$ and $P_3$, respectively. The vertices of the triangular electrode 1 are indicated by $q_1$, $q_2$ and $q_3$, respectively, and the angles at the vertices $q_1$, $q_2$ and $q_3$ are indicated by $\theta_1$, $\theta_2$ and $\theta_3$, respectively. Secondary machining feed vectors $\vec{a}$, $\vec{b}$ and $\vec{c}$ required for expanding the sides A, B and C of the electrode 1 uniformly by the value R will be described with respect to the feed vector $\vec{a}$. When perpendiculars are drawn from the vertex $q_1$ to the straight lines A' and B', they cross the straight lines A' and B' at points $r_2$ and $r_1$, respectively. Triangles $P_1r_2q_1$ and $P_1r_1q_1$ are right triangles which have a common side $\overline{P_1q_1}$ and sides $\overline{r_2q_1}$ and $\overline{r_1q_1}$ which are equal in length. Therefore, these two triangles are congruent with each other. Accordingly, the common side $\overline{P_1q_1}$, represented by the vector $\vec{a}$, is the bisector of the angles $\angle r_1P_1r_2$. Accordingly, when the electrode 1 is displaced as much as the vector a, the vertex $q_2$ undergoes a parallel movement to $\vec{a}$ point $q_2'$. The angle $\angle q_2$ of the parallelopiped $P_1q_1q_2q_2'$, can be represented by $\theta_1/2$. Therefore, the vector $\vec{a}$ has an azimuth of $(\theta_2 + \theta_1/2)$ and a magnitude of $R/\sin(\theta_1/2)$. Similarly, the other vectors $\vec{b}$ and $\vec{c}$ can be readily calculated. That is, the vectors $\vec{a}$, $\vec{b}$ and $\vec{c}$ have azimuths and magnitudes as indicated in FIG. 5. Consequentially, when the electrode is displaced relative to the workpiece 2 in the X-Y plane and according to the vectors $\vec{a}$, $\vec{b}$ and $\vec{c}$, the configuration formed in the workpiece 2 by the electrode corresponds to the configuration of the electrode even at the corners.

In the example shown in FIG. 4, the electrode 1 is triangular. However, it should be noted that the invention is not limited thereto or thereby. That is, with a polygonal electrode such as a rectangular electrode, a satisfactory configuration can be formed in a workpiece according to the invention.

Furthermore, if a method is employed in which the data of the intersections $P_1$, $P_2$ and $P_3$ of the lines $A'$, $B'$ and $C'$ are inputted into a numerical control device so that the vectors are calculated thereby, then the workpiece can be machined even more satisfactorily.

Figure 6:
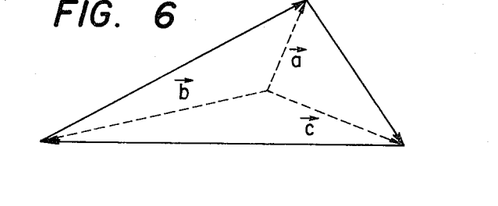

FIG. 6 shows secondary machining feed vectors which are continuous vectors obtained from the vectors a, b and c. A desired workpiece configuration can be obtained by effecting relative displacement of the electrode 1 and the workpiece 2 according to the vectors shown in FIG. 6.

Figure 7:
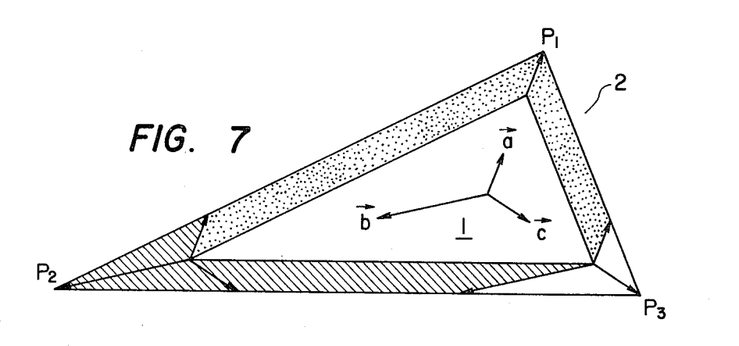
FIG. 7 is an explanatory diagram for a description of difficulties accompanying the method shown in FIG. 4.

The relation between the electrode 1 and the workpiece 2 will be considered, especially the machined region of the workpiece in the discharge machining method described above. As shown in FIG. 7, in the first relative displacement according to the vector $\vec{a}$, more than a half of the machining region is removed as indicated by the dotted area. Then, in the second relative displacement according to the vector $\vec{b}$, a larger part of the remaining machining region is removed as indicated by the hatched area. In the final relative displacement according to the vector $\vec{c}$, the machining region removed is considerably small. Accordingly, the amount of consumption of the electrode 1 attributed to the workpiece and the degree of chemical change of the electrode material attributed to thermal effects are greatly variable depending on the order of the relative displacements and on the directions of the relative displacements. Thus, in practice the resultant workpiece configuration may be different from the desired one because of the nature variation and deformation of the electrode.

Another example of the discharge machining method according to the invention in which the above-described difficulty has been eliminated will be described with reference to FIG. 8. This method is implemented with a vector machining process in which the electrode is fed according to predetermined displacement vectors in the X-Y plane. More specifically, the amount of vector movement at each displacement is made smaller so that a workpiece is machined by an electrode which is displaced several times in each displacement direction. Accordingly, the amounts of machining are, as a whole, averaged. The coordinates of the termination of each relative displacement vector are obtained and is then divided by n so that n coordinates are provided for each vector.

Figure 8:
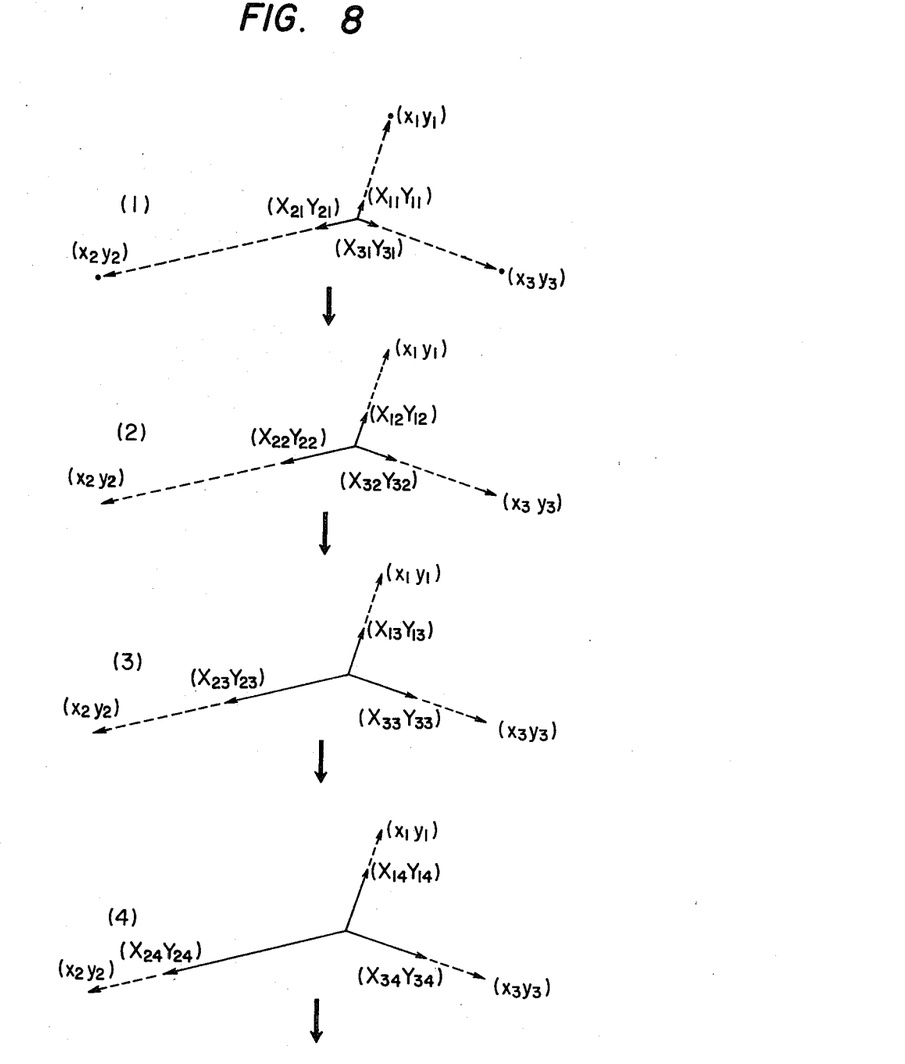
FIGS. 8 and 9 are explanatory diagrams for a description of relative displacement in second and third examples of the discharge machining method according to the invention.

In FIG. 8, the central point 0 has the reference coordinates (0, 0) and the final displacement vectors in the vector machining process are designated by $\vec{a}$, $\vec{b}$ and $\vec{c}$ whose coordinates are $(x_1, y_1)$, $(x_2, y_2)$ and $(x_3, y_3)$, respectively.

From the above description, the coordinates $(X_1, Y_1)$ of the termination of the vector $\vec{a}$ can be expressed by the following equations (1) and (2):

$$X_1 = |\vec{a}| \cos\left(\theta_2 + \frac{\theta_1}{2}\right) = \frac{R}{\sin\frac{\theta_1}{2}} \cos\left(\theta_2 + \frac{\theta_1}{2}\right) \quad (1)$$

$$Y_1 = |\vec{a}| \sin\left(\theta_2 + \frac{\theta_1}{2}\right) = \frac{R}{\sin\frac{\theta_1}{2}} \sin\left(\theta_2 + \frac{\theta_1}{2}\right) \quad (2)$$

The coordinates of the first termination $(X_{11}, Y_{11})$ of the vector $\vec{a}$ equally divided in n are $(X_1/n, Y_1/n)$, those of the second termination $(X_{12}, Y_{12})$ are $(2X_1/n, 2Y_1/n)$, those of the third termination $(X_{13}, Y_{13})$ are $(3X_1/n, 3Y_1/n)$, and so forth. Thus, the k-th displacement vector $\vec{a_k}$ can be represented by $(k/n)\vec{a}$, and its coordinates are $((k/n)X_1, (k/n)Y_1)$.

Similarly, the k-th displacement vectors $\vec{b_k}$ and $\vec{c_k}$ of the vectors $\vec{b}$ and $\vec{c}$ are $(k/n)\vec{b}$ and $(k/n)\vec{c}$ and their coordinates are $((k/n)x_2, (k/n)y_2)$ and $((k/n)x_3, (k/n)y_3)$, respectively.

In each of the direction of the vectors $\vec{a}$, $\vec{b}$ and $\vec{c}$, vector motion is effected n times each by increasing the amount of vector slightly. In other words, in the initial machining stage, the electrode is displaced according to the displacement vectors $\vec{a_1} = (x_1/n, y_1/n)$, $\vec{b_1} = (x_2/n, y_2/n)$ and $\vec{c_1} = (x_3/n, y_3/n)$. In the second machining stage, the electrode is moved according to the displacement vectors $\vec{a_2} = ((2/n)x_1, (2/n)y_1)$, $\vec{b_2} = ((2/n)x_2, (2/n)y_2)$ and $\vec{c_2} = ((2/n)x_3, (2/n)y_3)$, and so forth. Finally, in the n-th machining, the electrode is displaced according to the displacement vectors $\vec{a_n} = (x_1, y_1)$, $\vec{b_n} = (x_2, y_2)$ and $\vec{c_n} = (x_3, y_3)$. Thus, the vector machining process has been accomplished.

The method described above with reference to FIG. 8 is referred to as "a radial machining method". After machining the workpiece according to the vectors equally divided by n, the electrode is always returned to the standed coordinates (0, 0). In other words, the electrode is moved as the vector $\vec{a}$, the standard coordinates, the vector $\vec{b}$, the standard coordinates, the vector $\vec{c}$ and the standard coordinates, and the vector a in the stated order. This movement is repeatedly carried out.

If, in the displacement of the electrode in the directions of the vectors $\vec{a}$, $\vec{b}$ and $\vec{c}$, the regions to be machined are the same, then the surface of the electrode in the direction of the first machining vector performs the most machining. This is undesirable in the view point of the electrode consumption but can be eliminated by employing the following method. Instead of making the same the amounts machined for the displacements of the electrode in the directions of the vectors $\vec{a}$, $\vec{b}$ and $\vec{c}$, the periods of times required for the displacements of the electrode are made equal. By the employment of this technique, the problem of electrode consumption is solved, the amounts of powder created by the vector machining operations are equal, and furthermore, since the electrode is not held for a long time at a portion of the workpiece the machining of which is relatively difficult, the occurrence of abnormal arcs is prevented.

Of the machining regions, one corresponding to the shorter in length of the vectors $\vec{a}$, $\vec{b}$ and $\vec{c}$ is completely machined earlier than the others. Therefore, it is necessary to detect or confirm when that region has been machined completely so as not to further machine the region.

Another example of a method according to the invention will be described with reference to FIG. 9. The principle of this method is substantially identical to that of the method described above with reference to FIG. 8. The amount of vector in each displacement of the electrode is made smaller so that a workpiece is machined by an electrode which is displaced several times in each displacement direction.

Figure 9:
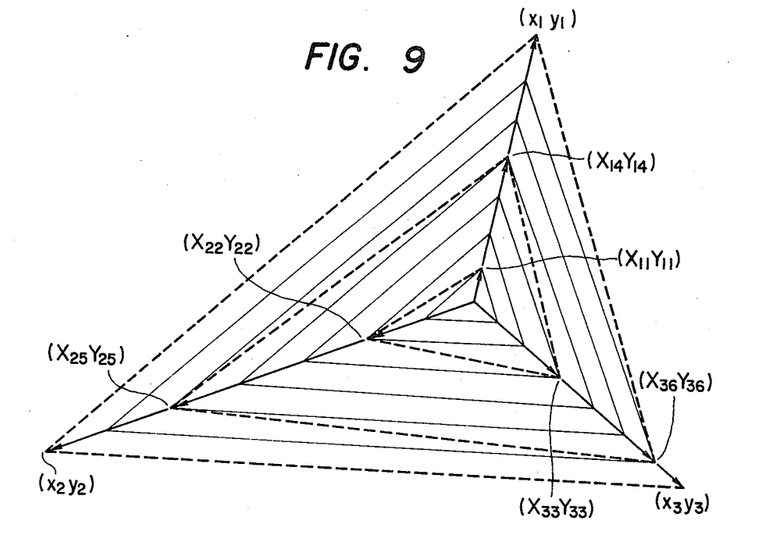

The method is a so-called "astronomical orbit machining method" and is different from the method in FIG. 8 in that, while in the method of FIG. 8 the electrode is returned to the standard coordinates whenever a displacement vector machining has been achieved, in the method of FIG. 9 machining is carried out without returning the electrode to the standard coordinates.

In the machining method, a workpiece is machined by moving the electrode according to vectors $\vec{a_1}=(X_{11}, Y_{11})$, $\vec{b_1}=(X_{22}, Y_{22})$, $\vec{c_1}=(X_{33}, Y_{33})$, $\vec{a_2}=(X_{14}, Y_{14})$, $\vec{b_2}=(X_{25}, Y_{25})$, $\vec{c_2}=(X_{36}, Y_{36})$ and so on in the stated order as indicated by the dotted line in FIG. 9.

Accordingly, the surfaces of the electrode 1 are evenly abutted against the workpiece and therefore the above-described difficulty can be eliminated. In order to perform the above-described intricate relative displacements of the electrode, a numerical control device (N/C) is employed. That is, first the coordinates $(X_1, Y_1)$, $(X_2, Y_2)$ and $(X_3, Y_3)$ are obtained and then the coordinates $(X_{11}, Y_{11})$, $(X_{22}, Y_{22})$, $(X_{33}, Y_{33})$, $(X_{14}, Y_{14})$, $(X_{25}, Y_{25})$, $(X_{36}, Y_{36})$ and so forth of the terminations of the vectors are obtained and the locus of displacement of the electrode is programmed accordingly. The programming is effected by punching a memory medium such as a paper tape. In machining a workpiece, the data recorded on the paper tape is read by the tape reader of a numerical control device in response to which the workpiece is automatically machined.

A discharge machining apparatus for practicing the above-described discharge machining method will be described with reference to FIG. 10.

Figure 10:
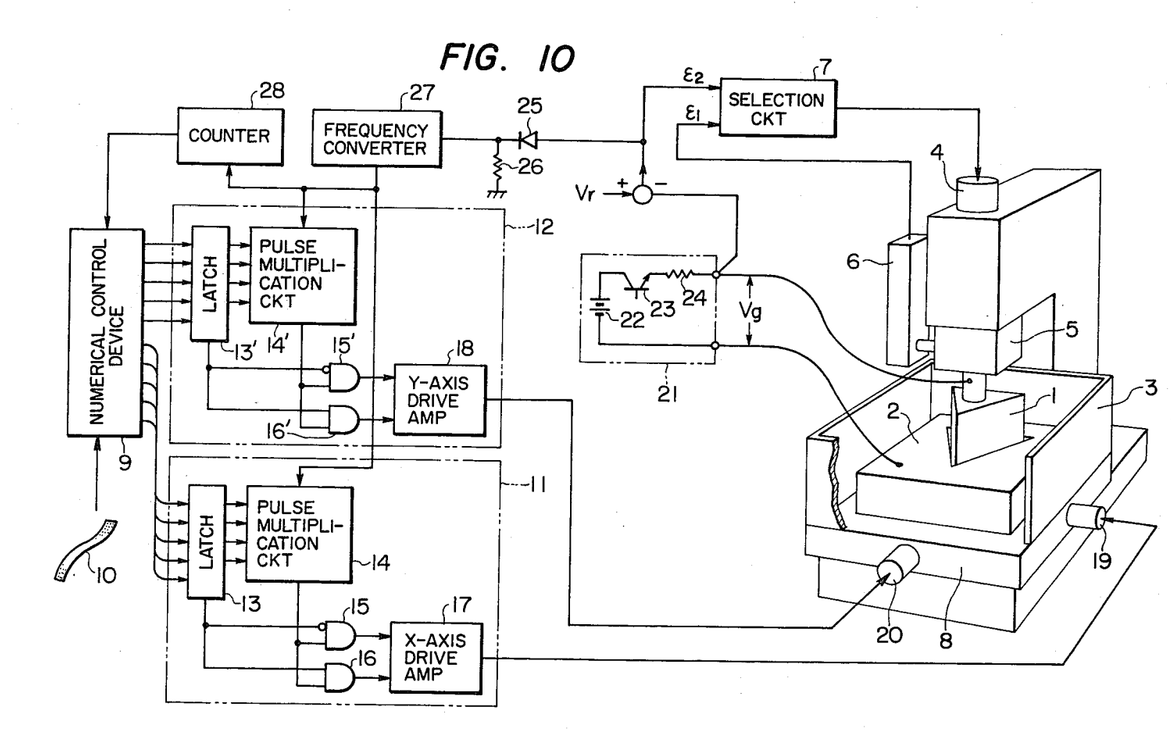
FIGS. 10 and 11 are explanatory diagrams, partly as block diagrams, showing first and second embodiments of a discharge machining apparatus for practicing the aforementioned methods according to the invention.

As shown in FIG. 10, an electrode 1 is confronted with a workpiece 2 to be machined in a machining tank 3 containing a machining solution (not shown). The electrode 1 is connected to a Z-axis drive head 5 which is driven by a Z-axis drive motor 4. The Z-axis drive is carried out by a combination of interelectrode space servo and position servo control in discharge machining. This drive method is as disclosed in Japanese Published Patent Application No. 32112/1978. The output $\epsilon_1$ of a position detector 6 and an interelectrode servo signal $\epsilon_2$ are applied to a decision and selection circuit 7 in which the lower of the two input signals is selected to perform the Z-axis servo operation so that the Z-axis drive head can be stopped at a predetermined position. In this operation, an X-Y drive table 8 on which the workpiece 2 has been placed is driven by a numerical control device 9 while a predetermined interpole space is being maintained. The above-described displacement or locus is programmed in a memory medium 10 such as a paper tape. The numerical control device 9 operates X and Y vector distribution circuits 11 and 12 according to the data recorded on the memory medium 10. The X vector distribution circuit 11 is made up of a latch circuit 13 for temporarily storing the X instruction output of the numerical control device 9, a pulse multiplication circuit 14 (which is a so-called "Binary Rate Multiplier (BRM)" such as a type No. SN7497 manufactured by Texas Instruments Co., positive and negative direction decision gates 15 and 16, and an X-axis drive amplifier 17 to drive an X-axis drive motor 19. The Y vector distribution circuit 12, which is fundamentally similar in arrangement to the above-described X vector distribution circuit 11, includes a latch circuit 13', a pulse multiplication circuit 14', positive and negative direction decision gates 15' and 16', and a Y-axis drive amplifier 18 to drive a Y-axis drive motor 20.

By the following control method, the X- and Y-axis drive motors 19 and 20 are operated as much as the aforementioned displacement data and the interelectrode space or gap is maintained unchanged. An average machining voltage Vg across the output terminals of a machining electric source 21 which are connected to the electrode 1 and the workpiece 2 is detected. Then, it is determined whether the average machining voltage Vg thus detected is higher than or lower than a reference set voltage Vr so that it is determined whether the interelectrode space between the electrode 1 and the workpiece 2 is larger or smaller or whether or not a short-circuit has occurred.

The machining electric source 21 is made up of a DC source 22, a switching element 23 and a current limiting resistor 24, for instance, as shown in FIG. 10 apply a pulse current at a frequency of the order of 1 KHz to 100 KHz to the electrode 1 and the workpiece.

The interelectrode servo signal $\epsilon_2$ is rectified by a diode 25 and a resistor 26 so that, only when the signal $\epsilon_2$ is positive in polarity, is the signal $\epsilon_2$ applied as a pulse signal having a frequency proportional to the signal $\epsilon_2$ through a frequency converter 27 to the pulse multiplication circuit 14. Accordingly, the output pulse of the pulse multiplication circuit is modulated with the interelectrode voltage and the X-Y displacement vectors are subjected to speed control according to the interelectrode space. As the predetermined amounts of X-Y displacement vectors are neither more nor less because the number to be multiplied is confirmed by a counter 28 adapted to count the output pulse of the frequency converter 27.

With the above-described apparatus, the electrode can be displaced relative to the workpiece as desired with the interelectrode space maintained unchanged. Thus, the apparatus can be used to readily and positively practice the discharge machining method of the invention.

In the above-described apparatus, the table on which the workpiece has been placed is described as being driven. However, the same effect can be obtained by similarly operating an electrode which is provided with an X-Y cross-head. Furthermore, if the apparatus is so modified that, while the X and Y drive motors are driven when the interelectrode servo signal $\epsilon_2$ is positive in polarity and the motors are driven in the opposite directions when the signal $\epsilon_2$ is negative, then the machining efficiency can be much improved.

In addition, it is evident that, if programming is carried out with a memory medium such as a paper tape so that the machining operations are switched in the order of coarse machining, middle machining and finish machining, then machining conditions are automatically switched as a result of which the machining efficiency is considerably improved.

Figure 11:
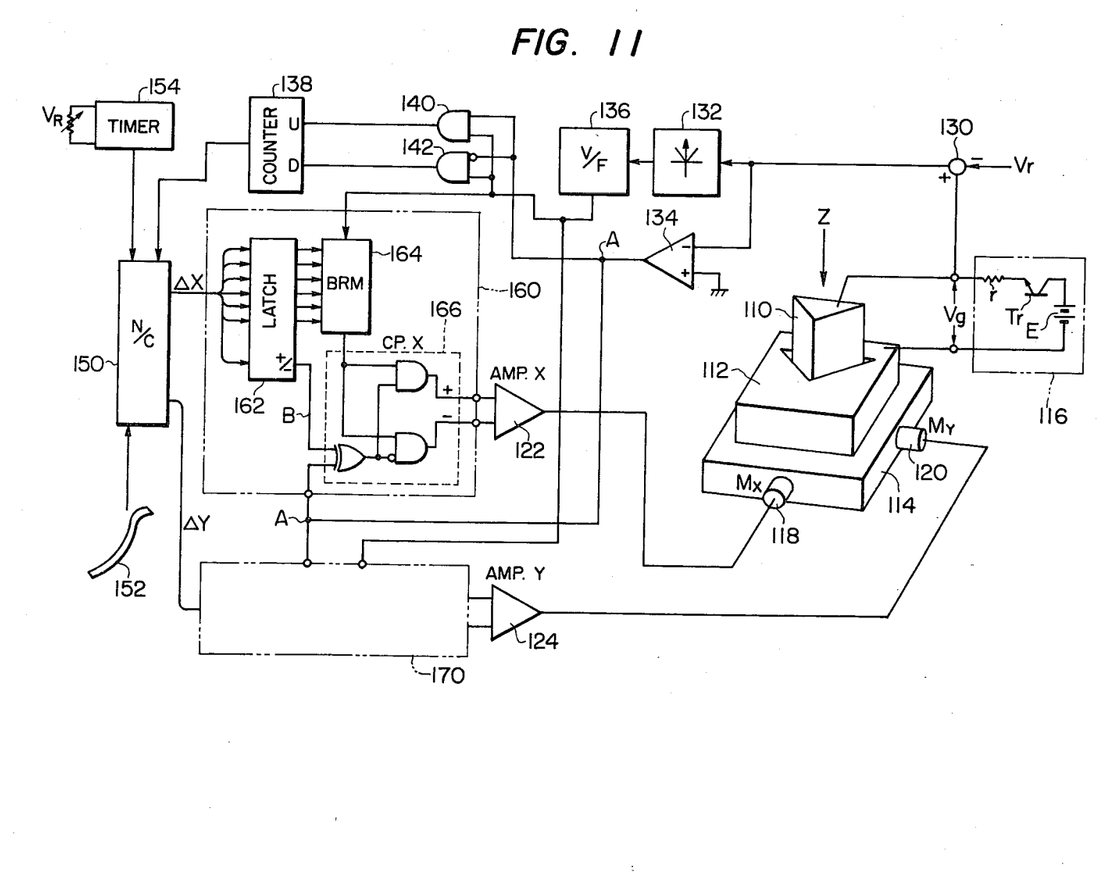

Another example of a discharge machining apparatus for practicing the method of the invention is shown in FIG. 11.

In the apparatus, an electrode 110 is confronted through a machining solution with a workpiece 112 positioned on a table 114. In this case, the primary machining feed is in the direction of Z-axis. A high-frequency pulse discharge machining voltage Vg is applied to the electrode 110 and the workpiece 112 by an electric source 116 so that discharge machining is effected therebetween. The table 114 is provided with an X-axis drive motor 118 and a Y-axis drive motor 120. Drive signals, namely, a positive pulse signal and a negative pulse signal according to the invention are applied to the motors 118 and 120 by motor drive amplifiers 122 and 124, respectively, so that secondary machining feed, that is, relative displacement of the electrode 110 and the workpiece 112, is carried out.

A comparator 130 is provided to compare the discharge machining voltage Vg and a reference voltage Vr and the comparison result, or the difference therebetween, is applied to an absolute value detecting circuit 132 and to a comparator 134. The difference voltage provided by the comparator 130 is dependent on the interelectrode space between the electrode and the workpiece. The difference voltage is converted to have a positive sign by the absolute value detecting circuit 132 and is then applied to a voltage-to-frequency conversion circuit 136 the output of which is is coupled as a pulse signal having a frequency corresponding to the interelectrode space. The output pulse signal of the conversion circuit 136 is applied to a multiplication circuit 164 in each of the vector interpolation circuits 160 and 170 which are described later, and to a variable counter 138 through gates 140 and 142. Under the normal discharge machining conditions, the comparator 134 outputs a signal A=0 because Vg>Vr. When abnormal arcs occur between the electrode 110 and the workpiece 112 or the electrode and the workpiece are short-circuited, then Vg≦Vr in response to which the comparator 134 outputs a signal A=1 to indicate the occurrence of abnormal conditions. Separately, according to the output signals A=0 and A=1, the variable counter 138 counts the output pulse of the conversion circuit 136 both upwardly and downwardly. When the number of output pulses thus counted reaches 2n, the counter 138 applies its output signal to a numerical control device (N/C) 150.

The numerical control device 150 is programmed with a paper tape so as to perform the secondary machining feed of the electrode 110. With the aid of a timer mechanism, namely, a timer 154, the numerical control device 150 outputs the X-Y coordinates of a displacement vector in one vector direction and terminates the provision of the output when the counter 138 has counted 2n pulses. When a predetermined period of time set by the timer 154 has passed, the numerical control device outputs incremental values Δx and Δy, up to a displacement vector in the next vector direction until the counter 138 has counted 2n pulses.

In FIG. 11, reference numeral 160 designates the aforementioned vector interpolation circuit for the X-distance of a displacement vector outputted by the numerical control device 150. The interpolation circuit 160 applies a drive signal to an amplifier 122 to operate the drive motor 118 according to the increment value Δx in X-distance inputted by the output positive or negative pulse signal of the amplifier 122. Further in FIG. 11, reference numeral 162 designates a latch circuit for storing the increment value Δx in X-distance outputted by the numerical control device 150. The latch circuit 162 applies an output to a pulse multiplication circuit 164 and provides an output B at its +/− terminal. When Δx is positive, B=1 and when Δx is negative, B=0. The pulse multiplication circuit 164 can be implemented with an integrated circuit type No. SN7497N manufactured by Texas Instrument Co. Assuming that the number of bits is n, when 2n pulses are applied to the circuit 164 by the conversion circuit 136, the circuit 164 applies pulses, the number of which is equal to the output value Δx of the latch circuit 162, to the amplifier 122 through a logic circuit 166. The logic circuit 166 operates so that with A=0 the polarity of the output pulse of the amplifier is the same as that of the +/− terminal of the latch circuit 162 and with A=1 the polarity of the output pulse is different from that of the +/− terminal of the latch circuit 162. Accordingly, when the comparator 134 outputs the signal A=1 which represents the occurrence of abnormal conditions, the electrode 1 is moved in a direction opposite to the direction of the displacement vector.

As was described before, the frequency of the pulse signal which is applied to the pulse multiplication circuit 164 by the conversion circuit 136 depends on the interelectrode space between the electrode 1 and the workpiece 2. Therefore, the time required for the circuit 136 to count 2n pulses during the predetermined period of time which elapses until the output of the timer 154 is switched is decreased as the displacement of the electrode 1 is increased. That is, the larger the difference between the discharge machining voltage Vg and the reference voltage Vr, the higher the displacement speed. The counting operation of the pulse multiplication circuit 164 is carried out from 0 to 2n in synchronization with the counter 138.

In FIG. 11, reference numeral 170 designates the aforementioned vector interpolation circuit for the Y-distance of a displacement vector outputted by the numerical control device 150. The arrangement of the circuit 170 is identical with that of the above-described vector interpolation circuit 160.

The operation of the discharge machining apparatus shown in FIG. 11 will be described.

First, a paper tape 152 on which a plurality of displacement vectors $\vec{a_1}, \vec{b_1}, \vec{c_1}, \vec{a_2}, \vec{b_2}, \vec{c_2}, \ldots \vec{a}, \vec{b}$ and $\vec{c}$ corresponding to vector directions a, b and c as shown in FIG. 8 have been stored is loaded into the numerical control device 150. Whenever the output of the timer 154 is switched, the numerical control device 150 applies the data $\vec{a_1}, \vec{b_1}, \vec{c_1}, \vec{a_2}, \ldots \vec{a}, \vec{b}$ and $\vec{c}$ successively to the vector interpolation circuits 160 and 170 which apply, in turn, drive signals corresponding to the displacement vectors to the drive motors 118 and 120 through the amplifiers 122 and 124, respectively, to displace the electrode 1 so that the workpiece is machined to a desired configuration. In this operation, the speed of the electrode 1 which is displaced according to a displacement vector is determined by the frequency of the output pulse signal of the conversion circuit 136 as described above. In other words, in the case where the amount of displacement is small as in the case of the displacement vector $\vec{a_1}$, the frequency of the output pulse signal of the conversion circuit 136 is low and accordingly the electrode 1 is slowly moved. As the amount of displacement is increased, as for the displacement vectors $\vec{a_2}$ and $\vec{a_3}$, the frequency of the output pulse signal of the conversion circuit 136 is increased and the speed of displacement of the electrode 1 is increased.

In the above-described example, the numerical control device 150 and the paper tape 152 operate as a preset mechanism, the amplifiers 122 and 124 and the vector interpolation circuits 160 and 170 operate as a control mechanism, the comparator 130 along with the absolute value detecting circuit 132 and the conversion circuit 136 operates as an electrode displacement detecting mechanism, and the timer 154 operates as a timer mechanism.

In the above-described example, the timer 154 is employed as the timer mechanism. However, it should be noted that the invention is not limited thereto or thereby. That is, the timer mechanism may be constituted by a counter or the like so that it operates with the time required for one displacement vector in one direction as a function of the number of times of occurrence of a short-circuit or as a function of the frequency of backward movement control.

The discharge machining methods of FIGS. 8 and 9 still involve the following problem. In the case where a discharge machining operation is such that discharge machining can be substantially achieved merely by one or two diplacements of the electrode in each voltage direction, the electrode space between the electrode and the workpiece is small or is not greatly changed. Accordingly, powder created by the machining operation may be caught in the electrode space and therefore arcs may occur therein. Thus, the machining speed is greatly reduced because of the secondary discharge.

This difficulty can be eliminated by the use of another example of a discharge machining method according to the invention. The method will be described with reference to FIG. 12.

Figure 12:
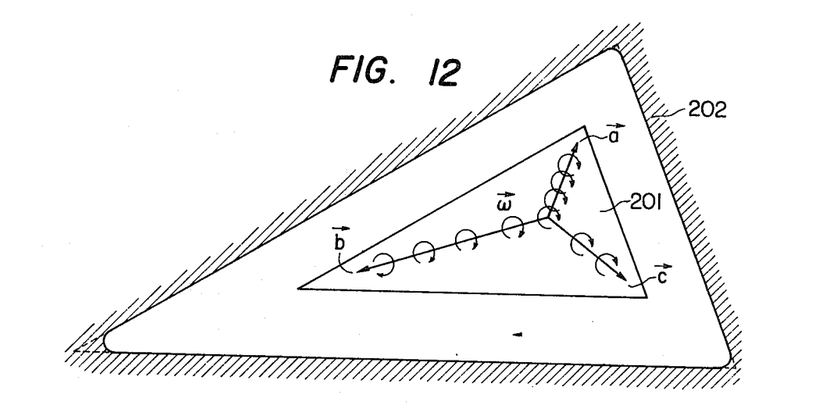
FIG. 12 is an explanatory diagram showing a fourth embodiment of the method according to the invention.

In FIG. 12, main machining loci are indicated by displacement vectors $\vec{a}, \vec{b}$ and $\vec{c}$. A rotational vector $\vec{\omega}$ is superposed on each of the displacement vectors. The rotational vector turns at a high speed of the order of 60 to 300 cycles per minute. The radius of the rotational vector is about 10 to 50 $\mu$m or it is set such that it will not substantially affect the final configuration of the workpiece. With this small radius, the powder created by the machining operation and caught in the interelectrode space between the electrode 201 and the workpiece 202 can be satisfactorily agitated to allow the powder to flow out of the interelectrode space. By the superposition of the rotational vector, the contact surfaces in the interelectrode space of the electrode 201 and the workpiece 202 is varied at all times and, accordingly, the electrode will not locally burdened. If a short-circuit occurs between the electrode and the workpiece because the interelectrode space is excessively small, then the radius of the rotational vector should be decreased so that the interelectrode space is quickly increased in order to prevent the production of a unsatisfactory workpiece due to the occurrence of arcs.

Another example of the discharge machining apparatus according to the invention which is suitable for practicing the method of FIG. 12 will be described with reference to FIG. 13.

A workpiece 202 is placed on an X-Y drive table 203 which is moved relative to an electrode 201 according to vectors $\vec{a}, \vec{b}$ and $\vec{c}$ as shown in FIG. 7 which are programmed by a control device such as a numerical control device 204 in advance. The numerical control device 204 operates to apply drive signals to table drive motors 206 and 207 until it receives a feed stop signal S from a comparator 205. The electrode 201 is fixedly secured to a cross head 208 which is moved parallel to the table 203 and in the X-Y plane by motors 209 and 210. Detectors 211 and 212 for detecting the displacement positions of the cross head 208 are provided by which voltages corresponding to displacement positions of the cross head 208 are applied to addition circuits 215 and 216, respectively. A two-phase oscillator 217 generates sine wave signals which are shifted by 90° in phase from each other, namely, $\phi_1 = \sin \omega t$ and $\phi_2 = \cos \omega t$. These signals $\phi_1$ and $\phi_2$ are applied to the addition circuits 215 and 216, respectively. The motors 209 and 210 are so driven that the difference voltages between these signals and the output voltages of the detectors 213 and 214 are zero respectively. That is, the motors 209 and 210 are rotated in response to the outputs of the two-phase oscillator 217 and therefore the cross head 208 is eccentrically turned with the period $\omega t$ of the signals $\phi_1$ and $\phi_2$. As a result, the relative displacement of the electrode 201 and the workpiece 202 is such that the linear motion due to the numerical control device 204 is combined with the eccentric rotational motion described above.

When the interelectrode space becomes smaller, the average value of the output terminal voltage Vg of a machining pulse source 220, smoothed by a resistor R and a capacitor C, is reduced. The averaged value thus reduced is detected by comparing it with a predetermined voltage level or reference voltage Vr with a comparator 205 and the output voltages of the two-phase oscillator 217 are set to zero volt by means of analog switches 221 and 222 and the cross head 208 is returned to the point at which the radius of the eccentric rotational motion is zero. On the other hand, the stop signal S is applied to the numerical control device 204 so that the operation of the apparatus is suspended until the interelectrode space between the electrode 201 and the workpiece becomes large enough. If the above-described operation cannot increase the interelectrode space to a sufficient value, the period of time during which the stop signal S is continuously applied is counted and in a predetermined period of time the numerical control device 204 outputs a reverse signal to obtain a sufficiently large interelectrode space.

In the above-described apparatus, the relative displacement of the electrode 201 and the workpiece 202 is effected under four-axis control. However, the objects of this invention can be achieved with two-axis control by employing a control device which can superpose the rotational vector on the instruction values.

Figure 13:
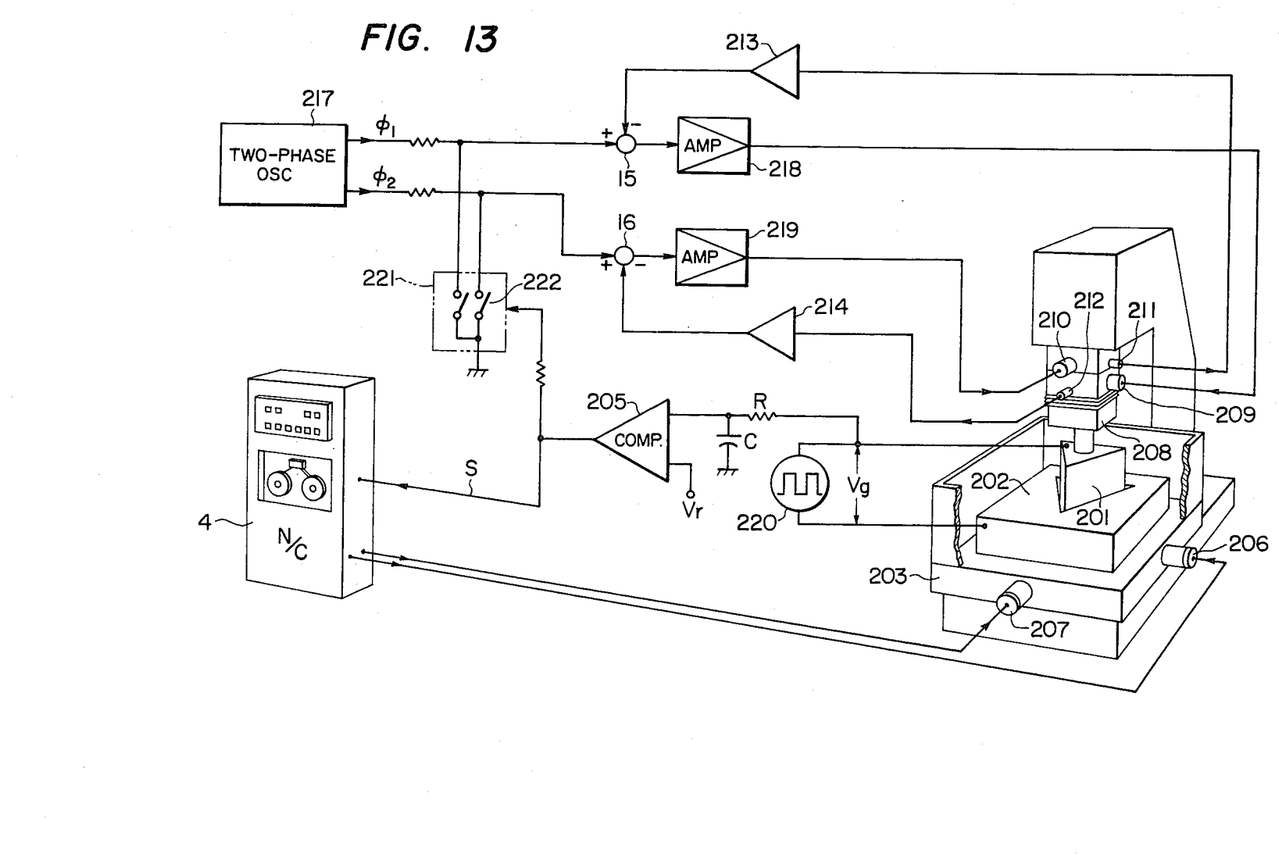
FIG. 13 is an explanatory diagram, partly as a block diagram, showing a third embodiment of the discharge machining apparatus for practicing the method shown in FIG. 12.

As is apparent from the above description, in the apparatuses shown in FIG. 13, the relative displacement of the electrode and the workpiece is carried out according to the displacement vectors superposed by the rotational vector $\vec{\omega}$. Therefore, powder or chips which are created during the machining operation are never caught in the interelectrode space. However, the resultant configuration of the workpiece is unavoidably somewhat round at the corners when compared with the ideal one. Since the space between the discharge machining electrode and the workpiece is, in general, of the order of 10 to 50 $\mu$m, such roundness occurs in any case. Accordingly, the superposition of a rotational vector having a radius of the order of 10 to 50 $\mu$m on main machining vectors will cause no problems in practice. Thus, according to the invention, the angular portions of a workpiece is improved in accuracy and the machining efficiency is remarkably improved. In addition, as the interelectrode space is suitably controlled in the relative displacement, the workpiece is machined satisfactorily at all times.

What is claimed is:

1. A discharge machining method for machining a workpiece by applying electric current to said workpiece and an electrode having a polygonal contour through a machining solution in the interelectrode space between said workpiece and said electrode comprising the steps of:

displacing said electrode and said workpiece relative to each other in a plane with the direction of movement of said electrode and said workpiece in said plane being substantially perpendicular to a primary machining direction, relative displacement of said workpiece and said electrode being such that a geometric center of said electrode moves along straight lines extending through a geometric center of an area to be machined and intersections of straight lines defining boundaries of said area to be machined such that, during movement along each said straight line extending through said geometric center of said area to be machined and one of said intersections, the two straight lines on said workpiece which form said one of said intersections are maintained parallel to respective two corresponding sides of said electrode, and gap widths between each of said two straight lines on said workpiece and said respective corresponding sides of said electrode are substantially the same throughout said movement; and performing discharge machining by controlling said electrode and said workpiece in such a manner that an interelectrode space is maintained between said electrode and said workpiece to an extent that electric discharge occurs in said interelectrode space.

2. The method as claimed in claim 1 in which said relative displacement is effected towards the intersections of adjacent straight lines which are parallel to and equally spaced from the polygonal contour of said electrode and wherein each said displacement is with a magnitude proportional to a distance from said geometric center of said electrode to a vertex of said electrode in the direction of movement of said electrode.

3. The method as claimed in claim 1 in which data representing the intersections of adjacent straight lines which are parallel to and equally spaced from the contour of said electrode is inputted into a numerical control device and said relative displacement is effected by means of said numerical control device.

4. A discharge machining method of machining a workpiece by applying electric current to said workpiece and an electrode having a polygonal contour through a machining solution in the interelectrode space between said workpiece and said electrode comprising the steps of:

displacing said electrode and said workpiece relative to each other in a plane with the direction of movement of said electrode and said workpiece in said plane being substantially perpendicular to a primary machining direction, relative displacement of said workpiece and said electrode being such that a geometric center of said electrode moves along straight lines extending through a geometric center of an area to be machined and intersections of straight lines defining boundaries of said area to be machined such that, during movement along each said straight line extending through said geometric center of said area to be machined and one of said intersections, the two straight lines on said workpiece which form said one of said intersections are maintained parallel to respective two corresponding sides of said electrode, and gap widths between each of said two straight lines on said workpiece and said respective corresponding sides of said electrodes are substantially the same throughout said movement; and performing discharge machining by controlling said electrode and said workpiece in such a manner that an interelectrode space is maintained between said electrode and said workpiece to an extent that electric discharge occurs in said interelectrode space.

5. The method as claimed in claim 4 in which the numbers of times of relative displacements in the directions of each of said straight lines extending through a geometric center of an area to be machined and intersections defining boundaries of said area to be machined are equal to one another in the period of time during which said electrode is in contact with workpiece.

6. A discharge machining method for machining a workpiece by applying electric current to said workpiece and an electrode having a polygonal contour through a machining solution in the interelectrode space between said workpiece and said electrode comprising the steps of:

displacing said electrode and said workpiece relative to each other in a plane with the direction of movement of said electrode and said workpiece in said plane being substantially perpendicular to a primary machining direction, relative displacement of said workpiece and said electrode being such that a geometric center of said electrode moves along straight lines extending through a geometric center of an area to be machined and final displacement points at intersections of straight lines defining boundaries of said area to be machined such that, during movement along each said straight line extending through said geometric center of said area to be machined and one of said intersections, the two straight lines on said workpiece which form said one of said intersections are maintained parallel to respective two corresponding sides of said electrode, and gap widths between each of said two straight lines on said workpiece and said respective corresponding sides of said electrode are substantially the same throughout said movement, and each mvement along each of said straight lines extending through said geometric center of said area to be machined and one of said intersections being decreased in length from the previous movement along the same line;

performing discharge machining by controlling said electrode and said workpiece in such a manner that an interelectrode space is maintained between said electrode and said workpiece to an extent that electric discharge occurs in said interelectrode space.

7. The method as claimed in claim 6 in which said electrode is so controlled that, at each intersection of adjacent straight lines, said electrode starts to move along a machining locus which extends from said intersection.

8. A discharge machining apparatus for machining a workpiece by applying electric current to said workpiece and an electrode through a machining solution in the interelectrode space between said workpiece and said electrode comprising:

first driving means for determining whether discharge machining is acceptable in a primary machining direction and if so for moving said electrode relative to said workpiece with a predetermined machining space being maintained between said electrode and said workpiece;

second driving means for moving said electrode relative to said workpiece in a direction substantially perpendicular to said primary machining direction;

a numerical control device for providing instruction signals to control an amount of relative movement of said electrode driven by said second driving means;

timer means, said numerical control device operating in response to said timer means to provide instruction signals for displacement vectors every predetermined period of time;

detection means for detecting an interelectrode voltage between said electrode and said workpiece to output a pulse signal having a frequency which corresponds to said interelectrode voltage thus detected; and means for outputting, when the number of pulses outputted by said detection mechanism reaches a predetermined value, a drive signal for a displacement vector provided by said numerical control device to drive said second driving device.

9. The apparatus as claimed in claim 8 in which said detection means comprises:

a comparator for comparing a machining voltage and a reference voltage to provide a difference voltage therebetween;

an absolute value detecting circuit for converting said difference voltage into an absolute value; and a voltage-to-frequency conversion circuit for converting an output signal of said absolute value detecting circuit into a corresponding pulse frequency.

10. A discharge machining method for machining a workpiece by applying electric current to said workpiece and an electrode through a machining solution in the interelectrode space between said workpiece and said electrode comprising the steps of:

displacing said electrode and said workpiece relative to each other in a plane with the direction of movement of said electrode and said workpiece in said plane being substantially perpendicular to a primary machining direction;

performing discharge machining by controlling said electrode and said workpiece in such a manner that an interelectrode space is maintained between said electrode and said workpiece to an extent that electric discharge occurs in said interelectrode space;

controlling said relative displacement of said workpiece and said electrode such that a geometric center of said electrode moves along straight lines extending through a geometric center of an area to be machined and intersections of straight lines defining boundaries of said area to be machined such that, during movement along each said straight line extending through said geometric center of said area to be machined and one of said intersections, the two straight lines on said workpiece which form said one of said intersections are maintained parallel to respective two corresponding sides of said electrode, and gap widths between each of said two straight lines on said workpiece and said respective corresponding sides of said electrode are substantially the same throughout said movement; and superposing a predetermined minute displacement motion on said relative displacement to an extent that machining accuracy is not affected by said superposition.

11. The method as claimed in claim 10 in which said minute displacement motion is imparted to said electrode.

12. The method as claimed in claim 10 in which said minute displacement motion is an eccentric rotational motion.

13. The method as claimed in claim 12 in which the radius of said eccentric displacement motion is controlled according to discharge machining conditions.

14. A discharge machining method for machining a workpiece by applying electric current to said workpiece and an electrode through a machining solution in the interelectrode space between said workpiece and said electrode comprising the steps of:

displacing said electrode and said workpiece relative to each other in a plane with the direction of movement of said electrode and said workpiece in said plane being substantially perpendicular to a primary machining direction, relative displacement of said workpiece and said electrode being such that a geometric center of said electrode moves along straight lines extending through a geometric center of an area to be machined and intersections of straight lines defining boundaries of said area to be machined such that, during movement along each said straight line extending through said geometric center of said area to be machined and one of said intersections, the two straight lines on said workpiece which form said one of said intersections are maintained parallel to respective two corresponding sides of said electrode, and gap widths between each of said two straight lines on said workpiece and said respective corresponding sides of said electrode are substantially the same throughout said movement; and performing discharge machining by controlling said electrode and said workpiece in such a manner that an electrode space is maintained between said electrode and said workpiece to an extent that electric discharge occurs in said interelectrode space; and superposing a predetermined minute displacement motion on said relative displacement to an extent that machining accuracy is not affected by said superposition.

15. A discharge machining apparatus for machining a workpiece by applying electric current to said workpiece and an electrode through a machining solution in the interelectrode space between said workpiece and said electrode comprising:

first driving means for determining whether discharge machining is acceptable in a primary machining direction and if so moving said electrode relative to said workpiece so that a predetermined machining space is maintained between said electrode and said workpiece;

second driving means for moving said electrode relative to said workpiece in a direction substantially perpendicular to said primary machining direction;

control means for controlling a relative position of said electrode and said workpiece according to a voltage across said interelectrode space; and minute displacement control means for minutely modifying said relative position of said electrode and said workpiece in association with said control of said control means.

16. The apparatus as claimed in claim 15 in which said minute displacement control means is controlled according to the conditions of said interelectrode space between said electrode and said workpiece.

* * * * *